June 14, 1949.  R. LETAC  2,473,033
STERILIZED AND AIR-CONDITIONED
CHAMBER FOR SURGICAL USES
Filed Oct. 10, 1946
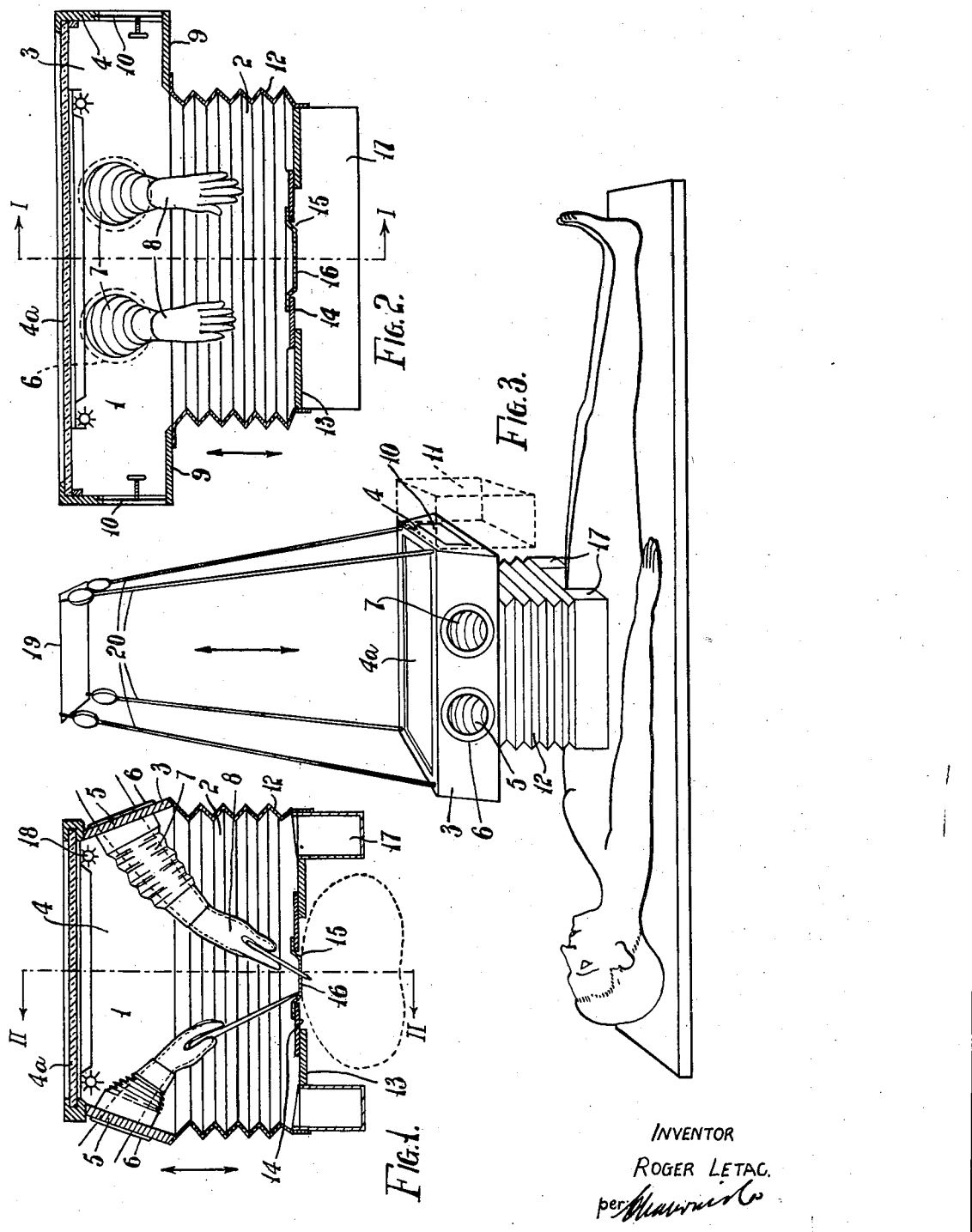
INVENTOR
ROGER LETAC.
per
ATTORNEYS Patented June 14, 1949

2,473,033

UNITED STATES PATENT OFFICE 2,473,033

STERILIZED AND AIR-CONDITIONED CHAMBER FOR SURGICAL USES

Roger Letac, Marseille, France

Application October 10, 1946, Serial No. 702,512
In France September 3, 1945

Section 1, Public Law 690, August 8, 1946
Patent expires September 3, 1965

2 Claims. (Cl. 128—1)

The invention relates to a sterilised and air-conditioned chamber for surgical uses, which is based on the principle of a closed vessel which consists in not opening to the atmosphere a sterilised receptacle which must not be soiled.

The use of this known principle applied to surgical purposes permits of operating under strictly aseptic and novel conditions by placing the operated wound in the presence of a suitably conditioned atmosphere as regards humidity and temperature on the one hand to suit the kind of operation and, on the other hand to suit the heat of the body.

This special atmosphere in which the wound to be treated is opened is obtained by pre-sterilisation and maintained so during the whole period of the operation which will eliminate the contamination at the moment of operation because the particles of water held in suspension in this sterilised atmosphere carried to and maintained at 37° C., normal heat of the human body, will no longer be subjected to microbic germs as would be the case when the atmosphere has not been aseptised.

It is therefore the possibility of operating in an atmosphere which is strictly aseptic and in which the physiological conditions considered here as novel, which justifies the protection of this invention which is represented in the accompanying drawings, given by way of explanation of its operation and capable also of serving as an example, not limitative, of its construction.

In these drawings:

Figure 1 shows the operating chamber in cross section taken on the line I—I of Fig. 2; Fig. 2 shows the same chamber in longitudinal section taken on the line II—II of Fig. 1 and Fig. 3 shows, to a smaller scale, an assembly view in perspective of the application of the operating chamber forming the subject of the invention.

The chamber consists of two main elements: the one 1 forming the upper part of the chamber, the other 2 being flexible and forming the lower part thereof. The upper part 1 has longitudinal sides 3 and transverse sides 4 preferably made of metal or of moulded plastic material which is inoxidisable and not liable to putrefaction.

A glass 4a, provided so as not to be stained by mist (such as crystal) hermetically closes this upper part of the chamber. On each of the longitudinal sides 3 are provided openings 5 receiving jointed mounting 6 to which are secured by known and appropriate means the flexible sleeves 7 made of impermeable tissue. These sleeves 7 receive and hold likewise in known manner, operating gloves 8.

The lower part of the rigid element 1 forms shelves 9 (see Fig. 2) on the longitudinal sides to receive the instruments. Watertight openings 10 are provided for the passage of these shelves from the outside and, in case of need also for a technical block 11 shown in dotted lines at Fig. 3.

The rigid element 1 is connected with the flexible element 2 which is preferably formed of rubber in the shape of a bellows 12, accordion type, the extension of which will permit the approach or withdrawal to a maximum of the horizontal parts of the two elements 1 and 2. The end 13 or lower face of this bellows comprises a panel 14 preferably of resilient rubber in which is formed a window 15 having a predetermined size. The opening of this window, constituting the operating field, is closed by a plate or membrane 16 of soft rubber or other suitable material.

On each of the longitudinal sides of the panel 14 there may be provided pockets 17 preferably of inoxidisable metal. These pockets are provided to receive the soiled instruments.

This equipment is completed by a lighting system 18 of appropriate nature simultaneously giving heat and intensity of light necessary for the operations and likewise by a suspension frame 19 securing winders of known type and operation having cables 20 maintaining the chamber above the patient.

Thus constructed the use of the sterilised and conditioned chamber is as follows:

The chamber and all its parts is heat sterilised in known manner and in an autoclave especially to facilitate this sterilisation.

The chamber thus prepared is set in position above the operating table, and is brought down onto the patient, Fig. 3, who presents the part of the body to be cut, immediately below the soft membrane 16, which is pressed tight onto the skin of the patient.

When this positioning is completed, the height of the chamber is adjusted by extending or shortening the cables 20 in order to cause no pressure upon the body of the patient.

The surgeon whose fore-arms have passed through the openings 5 in the sleeves 7 and his hands in the gloves 8, as also his assistant, if that is necessary, then proceeds to make the simultaneous incision of the membrane 16 and the skin of the patient. From this moment the opening up of the body of the patient takes place only in a strictly sterile medium and at the temperature of the body and wherein the humidity conditioning of the air avoids to a maximum the shock of the operation and all the hazards of development of objectionable germs, as actually occurs when the operation is executed in an atmosphere which is not aseptised or conditioned in accordance with the present invention.

I claim:

1. A sterilisable and air and heat-conditioned operating chamber of the kind comprising a flexible membrane at the lower part thereof adapted to be cut away at the time of incision, a sight glass for the operator at the upper part of said chamber, and a plurality of flexible glove members extending into said chamber, characterised in that the chamber is a rectangular prism at its upper part and a compressible bellows construction of reduced cross-section at its lower part, whereby the chamber can be manipulated to a relatively small size permitting of its introduction as a complete entity into an autoclave for sterilisation purposes, said flexible membrane being adjustable vertically relatively to the upper part of the chamber within wide limits by means of the said bellows construction so facilitating correct and air-tight positioning of the said flexible membrane onto the body of the patient.

2. A sterilisable and air- and heat-conditioned operating chamber as claimed in claim 1 comprising a plate forming the bottom of the chamber and having an aperture therein, a movable panel carried by the said plate, an opening of variable dimension in said plate, said flexible membrane being fastened over said opening whereby the field of operation is movable by the operator within limits, and means fitted within the compressible bellows for the provision of a lighting system and pockets for the reception of surgical instruments.

ROGER LETAC.

REFERENCES CITED

The following references are of record in the file of this patent:

UNITED STATES PATENTS

| Number | Name | Date |
| --- | --- | --- |
| 2,219,564 | Reyniers | Oct. 29, 1940 |
| 2,403,400 | Reyniers | July 2, 1946 |